United States Patent [19]
Sawazaki et al.

[11] 3,979,773
[45] Sept. 7, 1976

[54] MAGNETIC RECORDING AND REPRODUCING APPARATUS

[75] Inventors: Norikazu Sawazaki, Yokohama; Hiroyuki Tsukamoto, Kawasaki; Motoi Yagi, Zushi, all of Japan

[73] Assignee: Tokyo Shibaura Electric Co., Ltd., Kawasaki, Japan

[22] Filed: Apr. 22, 1974

[21] Appl. No.: 462,712

[30] Foreign Application Priority Data
Apr. 28, 1973 Japan............................ 48-47352
Apr. 28, 1973 Japan............................ 48-47354

[52] U.S. Cl.................................. 360/106; 360/93; 360/130
[51] Int. Cl.²..................... G11B 5/55; G11B 15/60; G11B 23/06
[58] Field of Search ............ 360/106, 107, 130, 93, 360/75, 85, 77–78; 242/55.19 R, 55.19 A, 197–198, 192

[56] References Cited
UNITED STATES PATENTS

| | | | |
|---|---|---|---|
| 3,486,675 | 12/1969 | Krechman........................... | 360/106 |
| 3,550,872 | 12/1970 | Porterfield................... | 242/55.19 A |
| 3,702,906 | 11/1972 | Camras.............................. | 360/106 |

*Primary Examiner*—Alfred H. Eddleman
*Attorney, Agent, or Firm*—Oblon, Fisher, Spivak, McClelland & Maier

[57] ABSTRACT

A magnetic recording and reproducing apparatus comprises a drive mechanism for running an endless magnetic tape of less than 300 m at a higher speed than 5 meters per second; a restricting member interlocking with the roll of said rapidly moving endless magnetic tape wound on a reel to apply a force against a centrifugal force generated on the tape roll so as to prevent it from being shaken unnecessarily; and a stationary magnetic head so arranged that the head is stational in a tape running direction and intermittently movable in a tape width direction to record frequency-modulated video signals in, and reproducing said signals from, the magnetic tape.

10 Claims, 24 Drawing Figures

MAGNETIC RECORDING AND REPRODUCING APPARATUS

This invention relates to a magnetic recording and reproducing apparatus using an endless magnetic tape and more particularly to an apparatus adapted to record and reproduce image signals.

This type of apparatus is generally known as a video tape recorder (hereinafter abbreviated as "VTR"). With the VTR, it has been desired to record and reproduce image signal in a high density to reduce the consumption of a magnetic tape as well as to allow the apparatus to have a simple construction and small size. However, since the prior art VTR apparatus of a rotary magnetic head type actually used is intended to make record and reproduce operations by the correlative movement of the tape and magnetic head, it is necessary to employ a tracking mechanism of high accuracy to reproduce the video signal. It has been known to use a narrow magnetic head to reduce a tracking pitch thereby increasing a recording density. Such a thin rotary magnetic head requires a tracking mechanism to be manufactured with higher precision as the tracks are arranged with greater density. As the result, a servo system for driving the tracking mechanism should be worked with high precision and unavoidably have a complicated arrangement.

Though it has been contemplated to employ a stationary magnetic head used in the recording and reproduction of an audio signal in same operations with a high density, this process has not been made for a signal of high frequency such as a television signal for the following reasons.

First, the speed of the correlative movement between the magnetic head and tape is required to record a high frequency signal and thus a higher tape speed such as more than 3 m/sec. is required since the magnetic head is stational. Accordingly, the tape must be long to obtain a desired recording and reproduction time, compared with a VTR of stationary magnetic head type.

Second, such running of a long tape at a high speed causes the tape roll to be not rotated at a constant speed, so that jitters are introduced in the reproduced image.

It is accordingly the object of this invention to provide a magnetic recording and reproducing apparatus which records and reproduces signals in and from a magnetic tape with high density, basing on the idea using a stationary magnetic head which has not been actually employed.

Further object of the invention is to provide an apparatus suitable for recording and reproducing a video signal which does not require any complicated servo mechanism, thus reducing the production cost of the apparatus.

This invention is based on a fact experimentally found that with an apparatus for recording and reproducing operations to an endless magnetic tape by means of stationary magnetic head, the tape may be run in a stable condition by driving the tape in a speed of more than 5 m/sec. more particularly 7 m/sec., and by applying to the tape roll, a restricting force against a centrifugal force generated in the tape roll due to such high speed rotation of the tape roll.

Further, it has been recognized by the experiments of inventors that the running stability of the tape is also affected by the length of a magnetic tape and if the tape is longer than 300 m wows and flutters are remarkably increased to be not suitable for recording and reproducing a video signal. As a reason to this phenomenon, it may be considered that the longer tape causes the tape roll to be larger in diameter to increase the total friction between the tape segments, resulting in the unstability of the tape running.

According to this invention, since the tape is traveled in a speed of more than 5 m/sec., FM-recording may be actually used and thus there may be reproduced a picture image of high resolution and S/N ratio which has not been accomplished by the prior art VTR apparatus of a stationary magnetic head. That is, although FM-recording of a signal is normally used in a rotary head type apparatus, the apparatus of stationary head type adopts an immediately recording technique non-modulating a signal because of low correlative speed of the head and tape. However, according to the invention, an FM-recording technique may be employed in combination with a stationary magnetic head. Therefore the apparatus has an advantage that the stroke between the adjacent tracks may be reduced since the frequency of a signal may be high and the wavelength thereof short in a whole range in addition to an advantage to be able to reduce amplitude variations of a signal, those advantages being inherently obtained by the FM-recording. With a magnetic recording although it has been known that the stroke is smaller, the recording wavelength is shorter, in an apparatus of rotary head type where the tracking stroke is extremely small, the reproduction tracking is difficult and a servo mechanism complicated so that it is impossible to reduce the stroke beyond a certain limit. On the contrary, the apparatus according to the invention allows the tape to be run in a stable state described above and employs a magnetic head fixed in a tape running direction, so that the track pitch is less than 100m to enable a high density recording by using a simple accurate mechanism to intermittently transfer a magnetic head which necessitates non servo mechanism.

This invention can be more fully understood from the following detailed description when taken in conjunction with the accompanying drawings, in which:

FIGS. 3A to 3C are oblique views of the magnetic head and its drive mechanism used with the apparatus of FIG. 2 wherein

FIG. 4 is a schematic oblique view showing the relative positions of the tape tracks and magnetic head;

FIG. 12, consisting of 12A through 12H, is a time chart for the electrical circuit shown in FIG. 11.

There will now be described by reference to FIGS. 1 to 4 the magnetic recording and reproducing apparatus of this invention using an endless magnetic tape.

Figure 1:
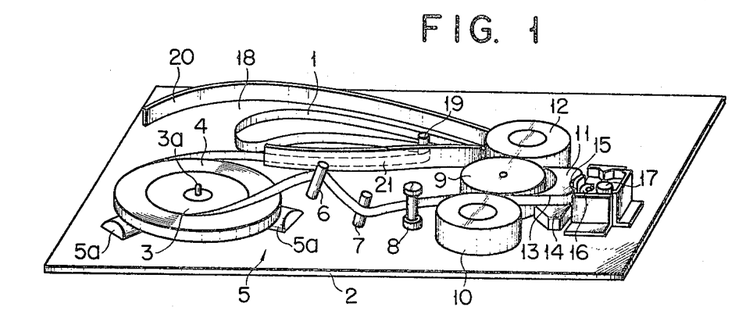
FIG. 1 is a schematic oblique view of a magnetic recording and reproducing apparatus according to an embodiment of this invention.
Figure 2:
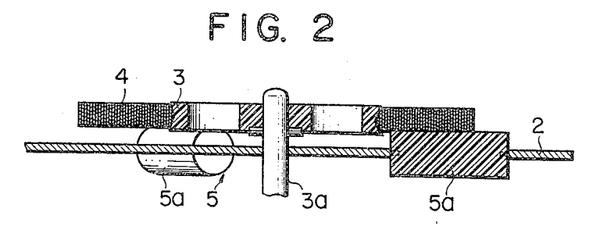
FIG. 2 is a detailed sectional view of the position of a support roll used with the apparatus of FIG. 1.

Referring to FIG. 1, a magnetic endless tape 1 may consist of the one prepared by forming a lubricant such as graphite on one side of a tape base having its opposite side coated with a magnetic layer in order to provide a smooth slide between the respective adjacent turns of a tape roll 4. The tape 1 is wound with an optional radius about a reel 3 disposed above a substrate 2 at a prescribed interval so as to rotate around the rotary shaft 3a. The tape roll 4 has a radius defined by the entire length and thickness of said tape 1 and the radius of the reel 3. The endless tape 1 is drawn out, as is well known in this particular field, from the innermost periphery of the tape roll 4 and again taken up on the outermost periphery of the tape roll 4 after passing along the later described tape running or guiding system. The tape roll 4 has its lower end face contacted with a restricting mechanism 5 which prevents said tape roll 4 from radially expanding by a centrifugal force applied to said tape roll 4 when it is rotated. In the preferred embodiment of this invention, the restricting mechanism 5 includes three conlumnar rubber support rollers 5a radially extending from near the rotary shaft 3a of the reel 3. Each rubber support roller 5a is disposed in an opening formed in the substrate 2 so as to rotate in a plane perpendicular to the surface of the substrate 2. The substantially upper half section of said support rubber roller 5a projects above the surface of the substrate 2 to be contacted with the lower end face of the tape roll 4.

First and second stationary guide poles 6, 7 are provided on the substrate 2 in inclined states at a prescribed interval. The tape drawn out from the innermost periphery of said roll 4 is guided forward by the first and second guide poles 6, 7 in turn with the under edge of the tape 1 kept parallel with the substrate surface. A third guide pole 8 is erected straight upright in the substrate surface, and provided with flanges at both top and bottom ends, enabling the tape 1 passing between said flanges to have its lower edge still maintained parallel with the substrate surface and also to be saved from a vertical shaking. After leaving the stationary guide pole 8, the tape 1 runs between a capstan 9 rotated by a drive source (not shown) and an inlet pinch roll 10 whose rubber peripheral wall is loosely pressed against the capstan 9 through the tape. The capstan 9 and inlet pinch roll 10 which may be of the known type cooperate in advancing the tape 1 when the capstan 9 is rotated by the drive source. The capstan 9 made of stainless steel is preferred to have as large a diameter as possible, for example 53 mm in this embodiment. The drive source of the capstan 9 may be of a 3,600 r.p.m. bipolar synchronous motor actuated by a commercial 60 Hz power source. A tape 1 run by the capstan 9 coupled with the rotary shaft of the motor has a speed of about 10 meters per second.

An outlet rubber pinch roll 12 is rotatably disposed on the opposite side of the capstan 9 to the inlet pinch roll 10. A crescent-shaped head-facing guide 11 is positioned close to the outer side of the capstan 9. Accordingly, the tape 1 travels between the inlet pinch roll 10 and capstan 9, while sliding over the outer segmental wall of said crescent-shaped head-facing guide 11 and then passes between the capstan 9 and outlet pinch roll 12. The crescent-shaped head-facing guide 11 is so disposed on the substrate surface as to cause the outer segmental plane 13 over which the tape 1 slides to maintain an exactly perpendicular position to the substrate 2. The flange formed at the lower edge of the head-facing guide 11 is provided with a guide section 14 for suppressing the vertical shaking of the traveling tape 1. The outer segmental wall of the head-facing guide 11 is bored at the center with a vertically extending shallow cavity 15 to allow a free space between said segmental wall and the tape 1 passing overthere. The magnetic head disposed opposite to said cavity 15 is intermittently moved crosswise of the traveling tape 1 at a very minute rate by means of the later described magnetic head driving mechanism 17.

A buffering device for the running tape 1 includes a fourth stationary guide pole 19 erected straight upright in the substrate surface near the outlet pinch roll 12 and a guide wall 18 extending from the proximity of the outlet pinch roll 12 toward the outermost periphery of the tape roll 4, said guide wall 18 being intended to hold the purposely loosened portion of the traveling tape 1 in order to cause the tape roll to be uniformly rotated, thereby holding the tape roll in constant take up velocity. The tape 1 which has passed between the capstan 9 and outlet pinch roll 12 first advances along the guide wall 18, and then is brought back to the fourth guide pole 19. Thereafter, the tape 1 is taken up on the outermost periphery of the tape roll 4 while being guided by the fourth guide pole 19. In other words, the tape 1 leaving the outlet pinch roll 12 is guided to form a loose portion of the letter S by the fourth guide pole 19 and guide wall 18, thereby being subjected to a buffering action before it is taken up on the outermost periphery of the remaining tape roll 4.

Figure 3A:
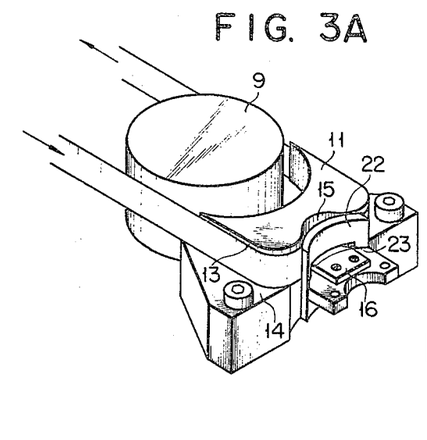
FIG. 3A shows the magnetic head and head-facing guide.
Figure 3B:
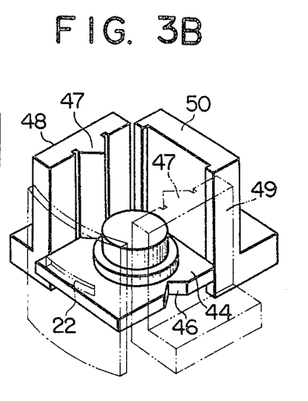
FIG. 3B illustrates a mechanism for guiding the vertical movement of the magnetic head, and FIG. 3C indicates a mechanism for moving the magnetic head in a vertical direction.
Figures 3C, 4:
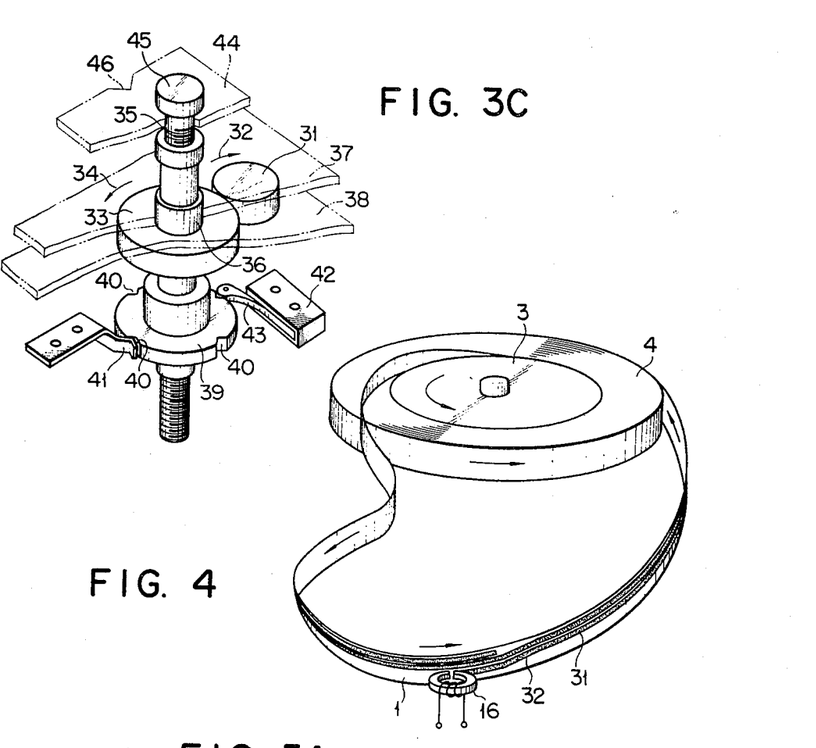

There will now be described the magnetic head 16 of FIG. 3A. The forward end portion of the magnetic head 16 extends toward the cavity 15 formed in the outer segmental plane of the head-facing guide 11 through a horizontal slit 23 bored substantially at the center of a convex tape-holding member 22. That part of the forward end portion of the magnetic head 16 which projects out of the slit 23 scans the traveling tape. The surface of said projecting end portion is disposed very close to said cavity 15, thereby enabling the tape 1 to travel between said surface and cavity 15 in a stable state. The magnetic head 16 and tape-holding member 22 are jointly fitted, as shown in FIGS. 3B and 3C, to the head fitting substrate 44 of the magnetic head-driving mechanism 17 to be intermittently lifted or brought down, namely, crosswise of the tape according to the vertical movement of the substrate 44. The tape-holding member 22 has a required vertical extension to allow the tape 1 to be stably guided between the head-facing guide 11 and said tape-holding member 22.

The magnetic head-driving mechanism 17 includes, as shown in FIG. 3C, a first friction wheel 31 rotated in the direction of the indicated arrow 32 by a motor (not shown). The first friction wheel 31 is tangentially contacted with a second friction wheel 33 which is driven in the direction of the indicated arrow 34 by the rotation of the first friction wheel 31. In the central hole of the second friction wheel 33 is securely fitted a nut 36 engaged with a vertically extending bolt 35. The upper and lower support plates 37, 38 fixed to the substrate 44 are respectively disposed on the opposite sides of the second friction wheel 33 to prevent its vertical shift.

A rotatable locating cam 39 is concentrically fitted to the lower end of the vertically extending nut 36, and has a plurality of engagement notches 40 arranged at a prescribed interval on the periphery. In this embodiment, four engagement notches 40 are formed at a peripheral distance of 90° and the bolt 35 has a thread pitch of 0.5 mm. When, therefore, the locating cam 39 is rotated through a peripheral distance of 90° by the first friction wheel 31 through the second friction wheel 33 and nut 36, then the bolt 35 makes a vertical movement at a pitch of 125 microns. An engagement plate spring 41 is disposed at a prescribed spot relative to the periphery of the locating cam 39 so as to have its free end elastically pressed against said periphery for engagement with any of the aforesaid four engagement notches 40, thereby fixing the position of the locating cam 39. An actuator 43 for operating a microswitch 42 is also elastically contacted with the periphery of the locating cam 39 which is positioned opposite to the engagement plate spring 41. Therefore, the end of the actuator 43 engages an engagement notch 40 separated through a peripheral distance of 180° from the engagement notch 40 registering with the free end of the plate spring 41. Upon engagement between the actuator 43 and one engagement notch 40, the microswitch 42 temporarily stops the rotation of a motor for driving the first friction wheel 31 by opening the power supply circuit (not shown) of said motor.

The magnetic head fitting substrate 44 is fixed to the upper end of the bolt 35 by a stationary nut 45 so as to be vertically moved jointly with said bolt 35. Two opposite sides of the magnetic head fitting substrate 44 have a triangular notch 46 cut out at the center, as illustrated in FIG. 3B. A pair of guide side plates 48, 49 are fitted to the substrate 44 straight upright so as to clamp said substrate 44 from both opposite sides. The mutually facing inner walls of the guide plates 48, 49 are each provided with a projecting engagement rib 47 having a triangular cross section and extending vertically of said guide plates 48, 49 so as to register with the aforesaid triangular notch 46 cut out in the side edge of the fitting substrate 44. The above-mentioned arrangement attains the stable vertical movement of the magnetic head fitting substrate 44. Further, a rear guide plate 50 is arranged on the rear side of said fitting substrate 44 so as to be disposed between the aforesaid paired guide plates 48, 49. As the result, the fitting substrate 44 has its three sides firmly supported by the guide plates 48, 49, 50 so as to be moved only in a vertical direction but not in a horizontal direction, except for the remaining front side fitted with the magnetic head 16 and tape-holding member 22.

According to the above-mentioned magnetic head driving mechanism 17, the rotating force of the first friction wheel 31 driven by a motor (not shown) is transmitted to the vertically extending nut 36 through the second friction wheel 33. This nut 36 whose vertical movement is restricted by the upper and lower support plates 37, 38 is only allowed to rotate, causing the bolt 35 coupled with the nut 36 to be moved vertically to an extent corresponding to an amount of rotation made by the nut 36. The magnetic head 16 connected to the bolt 35 through the fitting substrate 44 is moved in a vertical direction, namely, crosswise of the traveling tape 1 to an extent matching the vertical movement of the bolt 35.

Video signals are recorded in the numerous tracks 51 of a magnetic tape 1 along its length as illustrated in FIG. 5. The tracks 51 are formed at a prescribed minute pitch as viewed crosswise of the magnetic tape 1 and connected end to end at an inclined portion 52. When the end of the sliding element 43 of the microswitch 42 and the free end of the engagement plate spring 41 register with any of the engagement notches 40 of the locating cam 39, then the motor remains inoperative and in consequence the magnetic head 16 is kept stationary. Accordingly, scanning is made on the horizontal portion of each track extending from point $a$ to point $b$ on the traveling tape 1. When the scanning of the magnetic head 16 is brought to point $b$, then the motor is driven by a drive means to bring down the magnetic head 16 to a prescribed extent for the scanning of the inclined portion of each track 52. At this time, the locating cam 39 is also made to rotate. When the locating cam 39 makes a prescribed rotation for the engagement of the plate spring 41 and the sliding member 43 with any of the engagement notch 40, then a damping force is applied to the locating cam 39 by the plate spring 41 and the motor is stopped by the operation of the microswitch 42. As the result, the magnetic head 16 is prevented from being moved vertically, thereby causing scanning to be made on the horizontal portion of each track 52. The above-mentioned intermittent downward movement of the magnetic head attains the successive scanning of numerous tracks formed in a magnetic tape at a prescribed minute interval. As easily understood, video signals are reproduced in the same manner as when then are recorded.

The magnetic head 16 vertically moves, as previously mentioned, at a pitch of 125 microns in the foregoing embodiment.

In the case of a ½ inch tape, therefore, it is possible to record one hundred tracks of video signals by said 125 micron-pitch movement of the magnetic head, even though a margin 1 mm wide may be allowed on both edges of the tape. Where video signals are recorded and reproduced using such magnetic tape, projection lasting about 17 minutes will be realized, even if said tape only measures 100 meters in length.

Further, where carrier signals are frequency modulated by video signals when the latter signals are recorded in a magnetic tape and the carrier signals are subjected to necessary demodulation when the video signals are reproduced from the tape, then tracking can be effected easily by moving the magnetic head at a pitch of 125 microns. The above-mentioned modulation and demodulation of carrier signals can further reduce the movement of the magnetic head down to as small a pitch as about 60 microns. According to the foregoing embodiment wherein recording in a magnetic tape is carried out by modulating carrier signals having a relatively high frequency of 5 MHz by video signals, the wavelength of recorded signals is substantially rendered uniform and very short, thereby preventing an intertrack crosstalk and in consequence allowing the track pitch to be minimized as described above.

A motor-driving mechanism for the movement of a magnetic head to scan a new track may consist of any known device. For example, it is possible to use a timing switch designed to have such a length of timing as automatically actuates a motor power source after lapse of a period in which the horizontal portion of each track is scanned by the magnetic head, namely, the period in which the end of the sliding member 43 of the microswitch 42 and the free end of the plate spring 41 remain engaged with the engagement notches 40 of the locating cam 39. Further, another process may be adapted which consists in forming a light-reflecting region at the terminal end of the horizontal portion of each track, providing a source of light and a light-detecting means near a magnetic tape, causing said light-detecting means to generate an electrical signal when supplied with a beam of light from the source reflected by said light-reflecting region, and actuating the motor power source by said electrical signal.

There will now be described the experiments which measured the relationship between the running speed of a magnetic tape and its running stability, namely, the possible occurrence of wows and flutters.

Figure 5A:
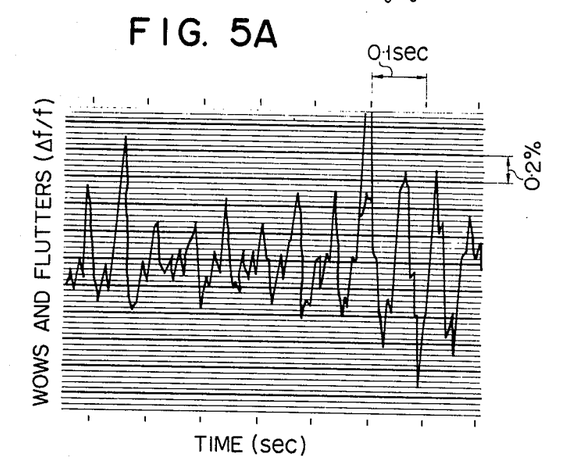
FIGS. 5A, 5B, 5C, 5D and FIg. 6 show the results of measuring the relationship of the speed of a magnetic tape run by the recording and reproducing apparatus of the invention and the occurrence of wows and flutters.
Figure 5B:
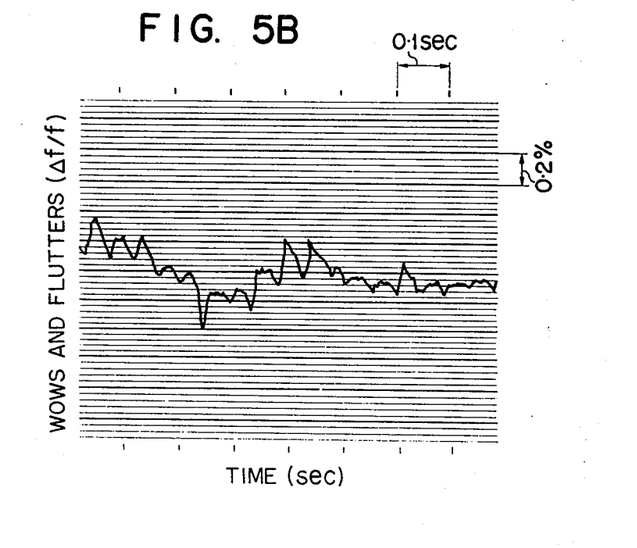
Figure 5C:
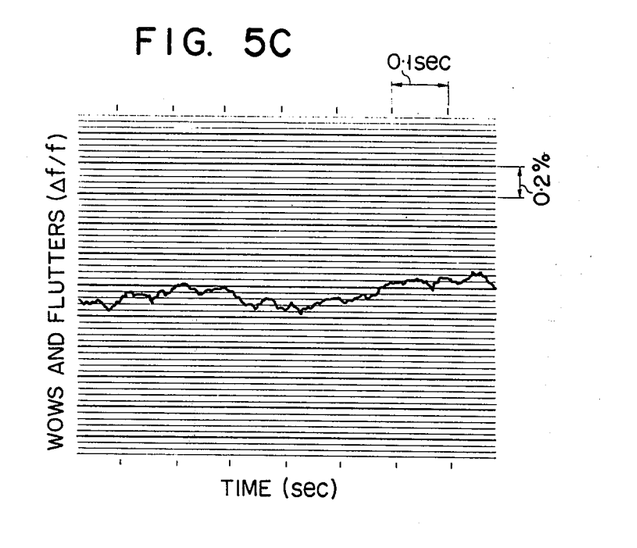
Figure 5D:
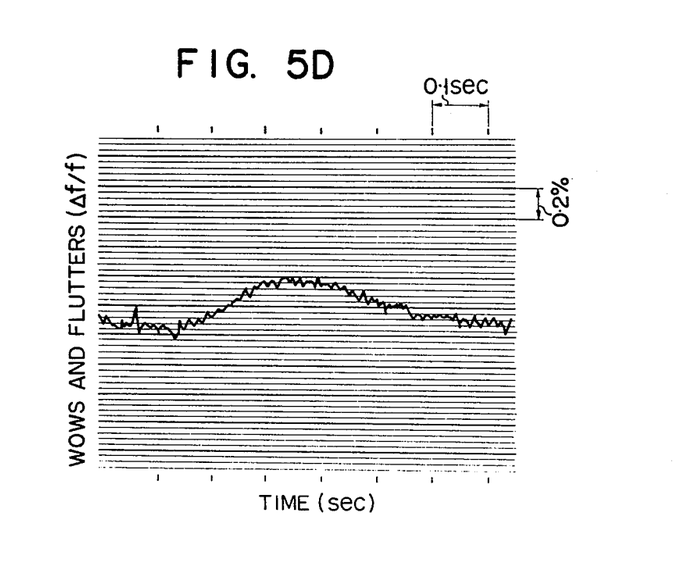
Figure 6:
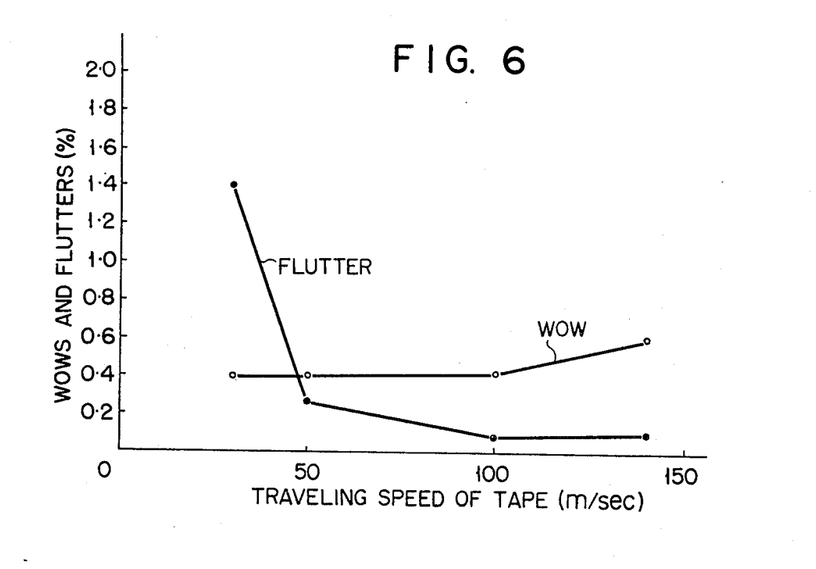

Determination of wows and flutters was carried out in the following manner. A magnetic tape was recorded with a 1 MHz carrier wave modulated by a 3 KHz sine wave. The recorded signals were scanned out by a magnetic head in a demodulated state to draw out 3 KHz signals. The changed frequency $\Delta f$ of the reproduced signals was determined to measure the ratio $\Delta f/f$ of said changed frequency $\Delta f$ to the original frequency $f$ of recorded signals. Determination was made of the occurrence of wows and flutters with respect to several 90 meters-long tapes respectively run at different speeds as 3 meters, 5 meters, 10 meters and 14 meters per second by exchanging capstans having various diameters, with the motor rotation being constant at the rate of 3,600 r.p.m. FIGS. 5A to 5D show wows and flutters thus measured in the form of electromagnetic oscillograms. In the oscillograms, the traveling speeds of the various tapes are plotted on the abscissa in seconds and the occurrence of flutters $\Delta f/f$ is plotted on the ordinate in percentage. Throughout these oscillograms, the abscissa denoting the traveling speed of the tapes is so short that wows consisting of signals having a relatively large wavelength (generally a repetitive wave of about several Hz units) do not distinctly appear, but flutters (generally a repetitive wave having a higher frequency than about 60 Hz) are predominantly presented. As apparent from FIGS. 5A to 5D, flutters become prominent for the 3 m/sec. speed of a tape (FIG. 5A), but are reduced for the 5 m/sec. speed (FIG. 5B), 10 m/sec. speed (FIG. 5C) and 14 m/sec. speed (FIG. 5D). FIG. 6 is a similar co-ordinate representation of the above measured results, in which the traveling speed of a tape is plotted on the abscissa and the percentage values of wows and flutters on the ordinate. As also seen from FIG. 6, the traveling speed of a magnetic tape higher than 5 meters per second decreases the occurrence of flutters.

Figure 7:
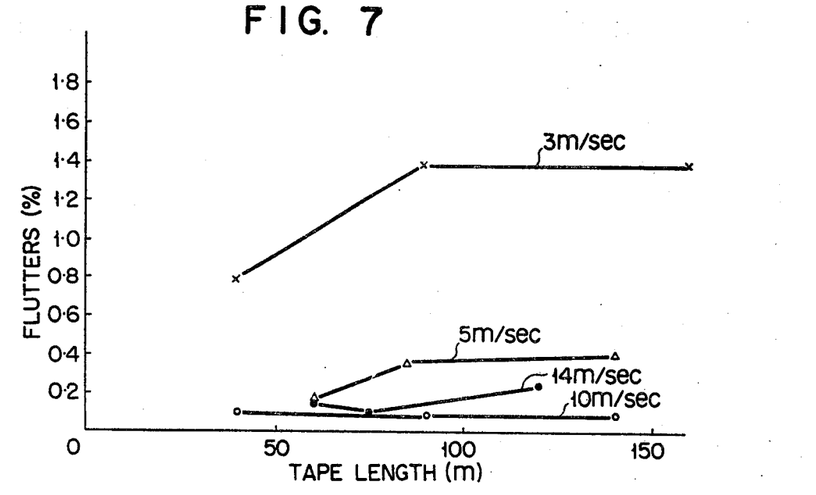
FIGS. 7 and 8 are curve diagrams showing the results of measuring the relationship of the tape length with the occurrence of flutters as well as with the occurrence of wows, with the traveling speed of the tape taken as a parameter.
Figure 8:
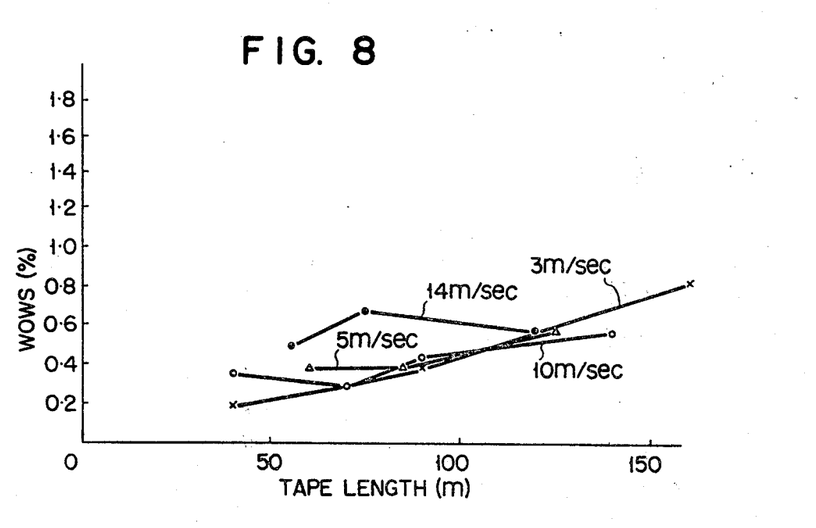

Similar experiments to those described above were made with several tapes having optional lengths ranging from 40 to 150 meters and run by the apparatus of this invention at the different speeds of 3 meters, 5 meters, 10 meters and 14 meters per second respectively to determine the occurrence of flutters and wows, the results being set forth in FIGS. 7 and 8. These figures show that a magnetic tape tends to give rise to more wows and flutters, as the tape increases in length, but that the higher traveling speed of the tape than 5 meters per second rapidly minimizes the occurrence of wows and flutters. The reason why the enlarged length of the tape results in the more prominent appearance of wows and flutters is assumed to originate with the fact that when the tape is considerably long, greater friction takes place between the respective turns of the tape roll 4 or between the tape roll 4 and the support or damping device 5 pressed against the lower end face of said tape roll 4, causing an aggregate tensional force Tv to occupy a larger percentage in the overall tensional force T applied to the tape roll 4 as a whole. The occurrence of wows and flutters resulting from the extended length of a magnetic tape can be reduced to a certain extent through improvement on the quality of tape material as well as on a device for supporting the tape roll 4. These improvements are practically applicable to minimize wows and flutters occurring in a magnetic tape having a length up to about 300 meters as inferred from the results of the aforesaid experiments.

Where recording was made in a magnetic tape about 100 meters run at a speed of 10 meters per second by modulating the frequency of image signals, then wows and flutters became little outstanding, providing a very distinct reproduced image.

Figure 9:
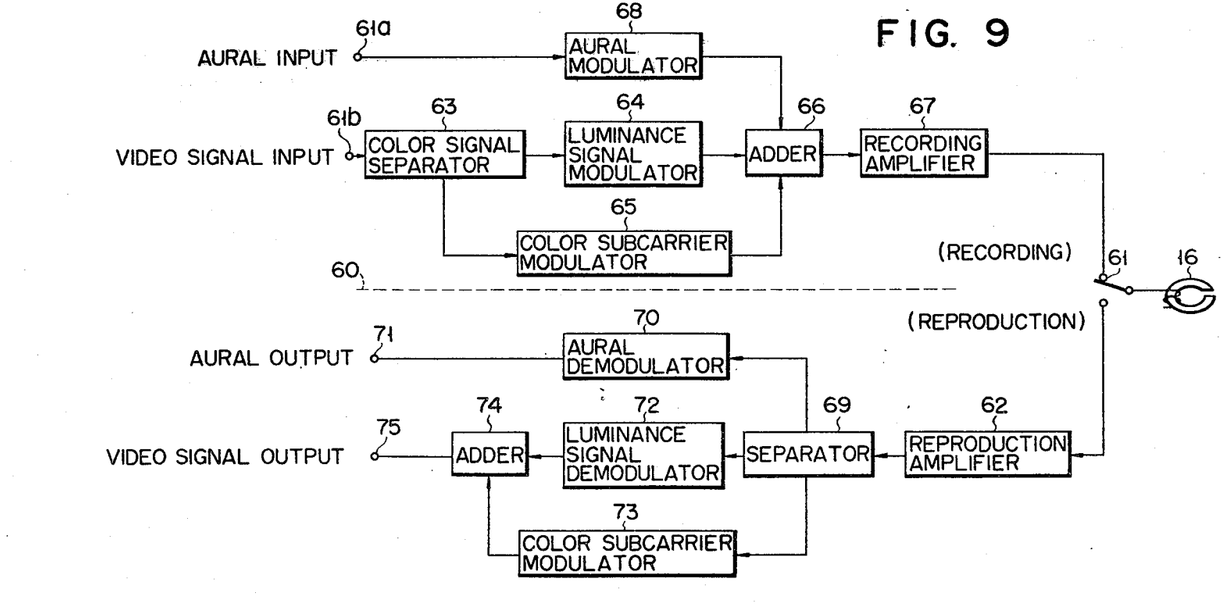
FIG. 9 is a block diagram of an electrical circuit for the frequency modulation of electrical signals which is applicable as the recording and reproducing circuit of the invention.

An electrical circuit used in the recording and reproduction of video signals through frequency modulation of carrier signals by said video signals may consist of the arrangement shown in FIG. 9. Referring to this arrangement, the upper half section denotes a recording circuit and the lower half section represents a reproduction section with a broken line 60 taken as a boundary. Both sections are selectively connected to the magnetic head 16 by a changeover switch 61.

In the case of recording, video input signals of color television enter the recording circuit through a video input terminal 61b. The input signals are divided into brightness signals and color signals by a color signal separator 63. The brightness signal is supplied to a frequency modulator 64 where said brightness signal is frequency modulated to have a frequency ranging, for example, from 3,8 to 5.5 MHz. On the other hand, a subcarrier of 3,58 MHz constituting a color signal has its frequency modulated to a low level, for example 767 KHz by a frequency converter 65. Outputs from both frequency modulator 64 and converter 65 are conducted to an adder 66, which is also supplied with an output from another frequency modulator 68 where a carrier wave having a low frequency of, for example, 200 KHz has been frequency modulated by an audio input signal brought through an input terminal 61a. Accordingly, the adder 66 produces an output signal bearing a frequency spectrum in which a frequency modulated aural signal, color subcarrier and frequency modulated luminance signal are arranged in the order mentioned as counted from the low-frequency side and also a frequency band ranges from 100 KHz to 6 MHz. Such an output from the adder 66 is amplified by a recording amplifier 67 and transmitted to a magnetic head 16 through a changeover switch 61 to record video signals in a magnetic tape.

In the case of reproduction, the changeover switch 61 is thrown in toward the reproduction circuit. A reproduced signal scanned by the magnetic head 16 is brought to a separator 69 after being amplified by a reproduction amplifier 62 and divided into a frequency modulated brightness signal, low frequency color subcarrier, and frequency modulated audio signal. Of these three signals, the frequency modulated audio signal is demodulated by a frequency demodulator 70 and drawn out through an audio output terminal 71. The frequency modulated brightness signal is demodulated by another frequency demodulator 72. The low frequency color subcarrier is modulated by a frequency converter 73 reversely from the frequency modulator 65 to have its frequency brought back to the original frequency of 3.58 MHz. Outputs from the frequency demodulator 72 and frequency converter 73 are put together in an adder 74 to be drawn out though a video output terminal 75.

The recording and reproduction apparatus of this invention arranged as described above enables aural signals and video signals constituting color television signals to be jointly recorded in the same tape by a single magnetic head, thereby attaining high density recording.

Figure 10:
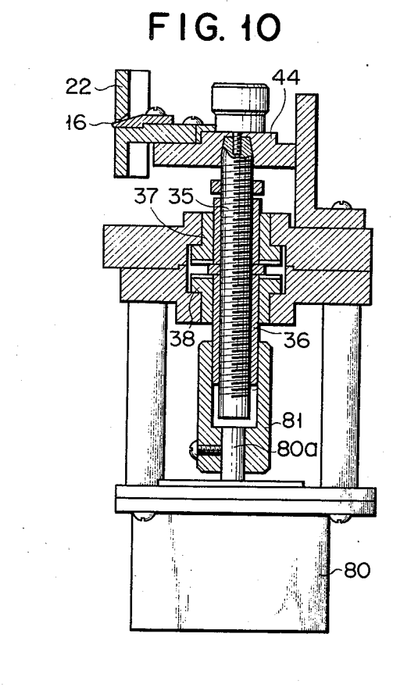
FIG. 10 is a sectional view of a modified mechanism for guiding the vertical movement of the magnetic head.

There will now be described by reference to FIGS. 10 to 12 a modification of the aforesaid magnetic head moving mechanism and its operation. The parts of FIG. 10 substantially the same as those of FIG. 3C are denoted by the same numerals, description thereof being omitted.

The substrate 44 fitted with the magnetic head 16 is fixed to the upper end of the bolt 35, which in turn is screwed into the rotatable nut 36 extending lengthwise of the bolt 35. The nut 36 is prevented from making any vertical movement by the upper and lower keep plates 37, 38. The lower end of the nut 36 is coupled with the rotatable shaft 80a of a pulse motor 80 by a connector 81. Accordingly, the drive of the pulse motor 80 leads to the rotation of the nut 36 and in consequence the vertical movement of the bolt 35 screwed into the nut 36, as well as of the magnetic head 16 fitted to the bolt 35. Therefore, the drive of the pulse motor 80 for a prescribed length of time gives rise to the corresponding vertical movement of the magnetic head 16. A bolt and nut may be so assembled that unlike the preceding embodiment including a rotatable nut and vertically movable bolt, the bolt is rotated with its vertical movement restricted, while the nut is vertically movable and prevented from rotation. In this case, the magnetic head is connected to the nut and the pulse motor is coupled to the bolt.

Figure 11:
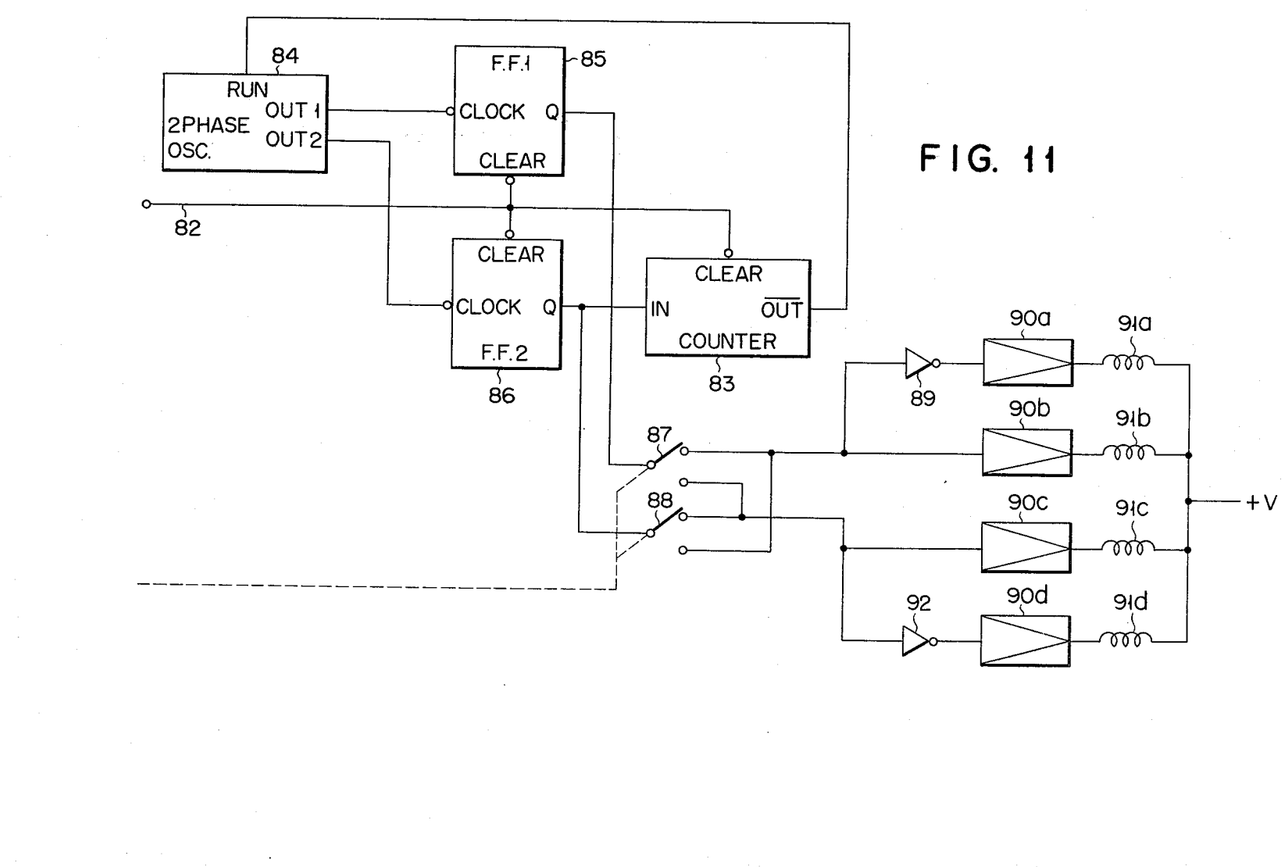
FIG. 11 is an electrical circuit for driving a pulse motor used in the mechanism shown in FIG. 10.
Figure 12A:
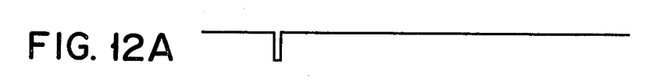
Figure 12B:
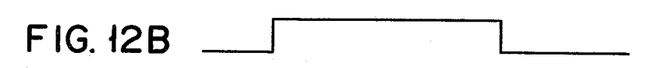
Figure 12C:
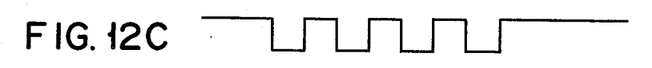
Figure 12D:
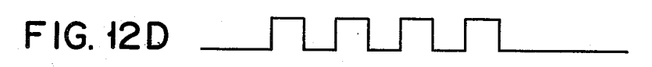
Figure 12E:
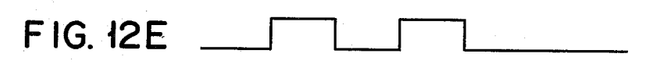
Figure 12F:
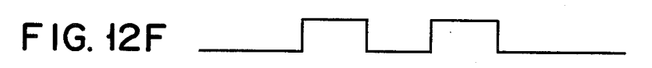
Figure 12G:
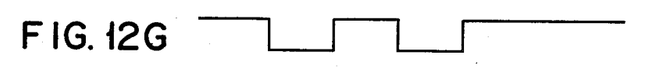
Figure 12H:
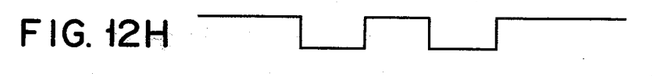

The drive circuit of the pulse motor 80 may be of a type shown in FIG. 11. Where, however, this drive circuit is used, it is necessary to provide means for detecting the completion of the running of an entire endless tape. With the use of the modification of FIG. 10, a reflection membrane is disposed at a spot facing the inclined portions of the tracks formed in the endless tape, namely, at a point indicated by b in FIG. 4. Further, the subject endless tape running apparatus is provided with a light source and photo-diode. Where, during the travel of the endless tape, the reflection membrane is brought into the illuminating range of the source of light, then the phototransistor receives a light reflected from said reflection membrane. A resultant output from the photo-diode is supplied as a starting pulse (FIG. 12a) to an input terminal 82 of the drive circuit of the pulse motor 80. Said output pulse is conducted to the clear terminal of a pulse counter 83, which in turn gives forth a light level output signal (FIG. 12b). This output signal is transmitted to a two-phase pulse generator 84 for its start. Two output signals from said pulse generator 84 have the phases displaced 180° from each other as shown in FIGS. 12c and 12d, and are conducted to the clock terminals of first and second flip-flop circuits 85, 86, which are operated at the fall of input signals delivered thereto. As the result, output signals from said flip-flop circuits 85, 86 have the phases displaced 90° from each other as shown in FIGS. 12e and 12f to have a frequency equal to half those from the pulse generator 84. After passing through a changeover switch 87, an output signal from the first flip-flop circuit 85 has its phase reversed, as shown in FIG. 12g, by a first inverter 89 and thereafter is supplied to the coil 91a of the pulse motor 90 through an output amplifier 90a. The signal from the circuit 85 is also sent to the coil 91b of said motor 90 through an output amplifier 90b. An output signal from the second flip-flop circuit 86 is transmitted to the counter 83, which, when supplied with two input pulses, produces a low level output in place of the previous high level one. After conducted through a changeover switch 88, an output signal from the second flip-flop circuit 86 has its phase reversed, as shown in FIG. 12g, by a second inverter 92, and thereafter is delivered to the coil 91d of the pulse motor 90 through an output amplifier 90d. The signal from the circuit 86 is also applied to the coil 91c thereof through an output amplifier 90c. Thus the pulse motor 90 is rotated upon receipt of four pulse signals having the phases displaced from each other. Where the changeover switches 87, 88 of FIG. 11 are respectively operated in the opposite direction, the pulse motor 90 obviously makes a reverse rotation. In the case of the quick run and rewind of an endless tape, it is advised, as known to those skilled in the art, to connect the above-mentioned switches 87, 88 with the drive circuit of the pulse motor 90 so as to cause a starting pulse to be continuously supplied to the input terminal 82 when said switches 87, 88 are thrown in.

What we claim is:

1. A magnetic recording and reproducing apparatus comprising:
    a substrate for rotatably supporting an endless magnetic tape roll,
    the tape having a length of less than 300 meters,
    driving means comprising a driving capstan and at least one pinch roll in contact with the capstan through the magnetic tape to run the tape,
    a plurality of rubber rolls rotatably mounted on the substrate and arranged in the radial direction of the tape roll to support the underside thereof to apply to the tape roll a force against a centrifugal force generated on the tape roll rotated by the driving means.
    a magnetic head,
    an electric circuit for supplying frequency modulated video signals to the magnetic head and for receiving frequency modulated video signals from the magnetic head.

2. A magnetic recording and reproducing apparatus according to claim 1 wherein the electric circuit comprises:
    an aural modulator for frequency modulating aural input signals,
    a video signal modulator for frequency modulating video input signals,
    an adder for adding modulated aural input signals and modulated video signals and for supplying the resultant output signals to the magnetic head, a separator for receiving the modulated signals from the magnetic head and for separating them into modulated aural signals and modulated video signals, an aural demodulator for demodulating the modulated aural signals from the separator and a video demodulator for demodulating the modulated video signals from the separator.

3. A magnetic recording and reproducing apparatus comprising:

a rotatable reel, an endless magnetic tape wound about said reel, driving means for running said magnetic tape at a higher speed than 5 meters per second, said tape having a length of less than 300 meters, wherein said driving means comprises a driving capstan and at least one pinch roll in contact with said capstan through said magnetic tape to run the tape;

restricting means for applying to said tape roll a force against a centrifugal force generated on said tape roll rotated by said driving means, said restricting means comprising a plurality of rolls arranged in the radial direction of said tape roll to frictionally support the underside thereof;

magnetic head for recording frequency modulated signals in said magnetic tape and reproducing said recorded signals from said magnetic tape; and, means for moving said magnetic head crosswise of said magnetic tape by a predetermined distance, wherein said magnetic head moving means comprises a mechanism for intermittently moving said magnetic head in the crosswise direction of the tape in synchronism with substantially one cycle of tape running, said mechanism including an assembly of a bolt and a nut, said assembly being connected to the magnetic head, and a member for rotating said bolt or said nut by a predetermined angle in synchronism with one cycle of tape running.

4. A magnetic recording and reproducing apparatus according to claim 3 wherein the rolls are rubber rolls.

5. A magnetic recording and reproducing apparatus according to claim 3 wherein the magnetic tape has a length of less than 150 meters.

6. A magnetic recording and reproducing apparatus according to claim 3 wherein the member comprises a pulse motor and a pulse generating circuit to apply pulse signals to the motor in accordance with one cycle of the tape running.

7. A magnetic recording and reproducing apparatus according to claim 3 wherein the member comprises:

a rotary disk connected to the nut for rotating it, a rotary cam disk fixed to the nut and having a plurality of notches formed in the periphery thereof, an engraving member for engagement with the notch to hold the cam disk in its position when the cam disk is rotated by a predetermined angle, and a microswitch for stopping the rotary disk when the engaging member is engaged with the notch in the cam disk.

8. A magnetic recording and reproducing apparatus comprising:

a rotatable reel, an endless magnetic tape wound about said reel, driving means for running said magnetic tape at a higher speed than 5 meters per second, said tape having a length of less than 300 meters, wherein said driving means comprises a driving capstan and at least one pinch roll in contact with said capstan through said magnetic tape to run the tape;

restricting means for applying to said tape roll a force against a centrifugal force generated on said tape roll rotated by said driving means, said restricting means comprising a plurality of rolls arranged in the radial direction of said tape roll to frictionally support the underside thereof;

a magnetic head for recording frequency modulated signals in said magnetic tape and reproducing said recorded signals from said magnetic tape; and, means for moving said magnetic head crosswise of said magnetic tape by a predetermined distance, wherein said magnetic head moving means comprises a mechanism for intermittently moving said magnetic head in the crosswise direction of the tape in synchronism with substantially one cycle of tape running, said mechanism including a bolt movable in its axial direction and having one end connected to said magnetic head, a rotatable nut engaged with said bolt and restricted with respect to movement in the axial direction, and a member for rotating said nut to move said bolt in synchronism with one cycle of the tape running.

9. A magnetic recording and reproducing apparatus comprising:

a rotatable reel, an endless magnetic tape wound about said reel, driving means for running said magnetic tape at a higher speed than 5 meters per second, said tape having a length of less than 300 meters, restricting means for applying to said tape roll a force against a centrifugal force generated on said tape roll rotated by said driving means, a magnetic head for recording frequency modulated signals in said magnetic tape and reproducing said recorded signals from said magnetic tape, means for moving said magnetic head crosswise of said magnetic tape by a predetermined distance; and, an electric circuit for supplying said frequency modulated signals to said magnetic head and for receiving recorded signal from said magnetic head.

10. A magnetic recording and reproducing apparatus according to claim 9 wherein the electric circuit comprises:

a aural modulator for frequency modulating aural input signals, a video signal modulator for frequency modulating video input signals, an adder for adding modulated aural input signals and modulated video signals and for supplying the resultant output signals to the magnetic head, a separator for receiving the modulated signals from the magnetic head and for separating them into modulated aural signals and modulated video signals.

an aural demodulator for demodulating the modulated aural signals from the separator and a video demodulator for demodulating the modulated video signals from the separator.

* * * * *